United States Patent [19]

Wakabayashi et al.

[11] 4,313,224
[45] Jan. 26, 1982

[54] MONITORING SYSTEM OF AN OPTICAL POWER IN AN OPTICAL REPEATER

[75] Inventors: Hiroharu Wakabayashi, Kawasaki; Yasuhiko Niiro, Yokohama, both of Japan

[73] Assignee: Kokusai Denshin Denwa Co., Ltd., Tokyo, Japan

[21] Appl. No.: 146,687

[22] Filed: May 5, 1980

[30] Foreign Application Priority Data

May 17, 1979 [JP] Japan ................................ 54-59743

[51] Int. Cl.³ .............................................. H04B 9/00
[52] U.S. Cl. ..................................... 455/601; 455/603; 455/606
[58] Field of Search ............... 455/601, 603, 606, 600; 356/237, 239

[56] References Cited

U.S. PATENT DOCUMENTS

| | | | |
|---|---|---|---|
| 3,943,358 | 3/1976 | Reymond et al. | 455/601 |
| 3,981,592 | 9/1976 | Williams | 455/601 |
| 4,019,048 | 4/1977 | Malone et al. | 455/601 |
| 4,211,920 | 7/1980 | Wakabayashi | 455/601 |
| 4,257,033 | 3/1981 | Ota et al. | 455/601 |
| 4,257,124 | 3/1981 | Porter et al. | 455/601 |

*Primary Examiner*—Robert L. Richardson
*Assistant Examiner*—Edward L. Coles
*Attorney, Agent, or Firm*—Armstrong, Nikaido, Marmelstein & Kubovcik

[57] ABSTRACT

The operation of a laser in an optical repeater in an optical transmission system using an optical fiber cable is telemonitored at a terminal station by changing the mark ratio of the test signal which is transmitted from the terminal station to the circuit. Each of the repeaters has an optical-electrical conversion element for the conversion of the input optical energy to electrical energy, an amplifier for amplifying the electrical output of said conversion element, a laser for converting the electrical output of the amplifier to an optical output power, a device for controlling the optical output power of the laser, a switch for providing the signal return path between the upward circuit and the downward circuit, and a monitoring circuit having a reference voltage generator for providing a reference lever which is lower than the normal signal level when the signal has the mark ratio of ½, and a comparator for comparing the laser output with the reference level, and a device for turning OFF the switch when the monitoring circuit provides the output signal indicating that the laser output is equal to the reference level. The terminal station designates the particular repeater and closes the switch of the designated repeater, then, transmits the test signal having the controlled mark ratio. That test signal returns to the terminal station reflected by that closed switch. By adjusting the mark ratio of the test signal, the monitoring circuit of the repeater provides the output when the laser output equals to the reference level, and has the switch turned OFF. Thus, the terminal station recognizes the degree of the degration of the laser from the mark ratio when the circuit is broken.

5 Claims, 6 Drawing Figures

MONITORING SYSTEM OF AN OPTICAL POWER IN AN OPTICAL REPEATER

BACKGROUND OF THE INVENTION

The present invention relates to a monitoring system of an optical power in an optical repeater utilized in an optical communication system, in particular, relates to such a system in which the tele-monitoring of an optical power in an optical repeater is possible from a terminal station on land.

In an optical communication system which utilizes an optical fiber as a transmission line, when there is something wrong with a transmission line and/or a repeater, the fault point must be quickly located and must be repaired. Therefore, the operation of the transmission line and/or repeaters must be tele-monitored in terminal stations on land.

When an optical transmission system is installed on land, an interstitial wire which is made of conductive metal wire is attached along the optical transmission line for the transmission of the monitoring signal of the repeaters. The test and/or the control of repeaters is performed through that interstitial wire to locate the fault point.

When an optical transmission system is installed in the seabed, that interstitial wire is not desirable in view of the complicated structure and/or the reliability of a submarine transmission cable. FIG. 1 shows the prior monitoring system for repeaters in a submarine cable. In the figure, the reference numeral 1 is the upward transmission line, 2 is the downward transmission line, 3 is a repeater in the upward direction, 3a is a repeater in the downward direction, 4 is an optical fiber transmission line, and 5 is a return path selectively provided between an upward repeater 3 and a downward repeater 3a. Also, T₁ and T₂ are terminal stations installed on land. A set of repeaters 3 and 3a and a return path 5 are mounted in a single housing of a repeater. The terminal station on land controls that return path of the selected repeater to close when that repeater is to be tested, and provides the circular transmission path through the downward transmission line 2, the repeater 3a, the return path 5, the repeater 3, and the upward transmission line 1. Then, the terminal station transmits the test signal in that circular transmission path. Therefore, the test signal travels in that circular transmission path and returns to the terminal station. Then, that terminal station compares the received signal with the transmitted test signal, and determine the code error rate in that circular transmission path. In this case, if the return path 5 is provided in each repeater alternately, the difference of the code error rates can be obtained, and then, from that difference the repeater in the fault can be located.

By the way, the most important element in an optical repeater so far as the failure is concerned, is an optical power source which converts the electrical energy to the optical energy. That converted optical energy is transmitted into an optical transmission line. That optical power source is usually implemented by a laser. Accordingly, a monitoring system which monitors the bias current applied to the laser in a repeater has been proposed for an optical transmission system on land. FIG. 2 shows the block diagram of that monitoring system, and in the figure, the reference numeral 4 is an optical fiber, 6 is an optical power source or a laser, 7 is an APC control, 8 is a modulator, 9 is an interstitial wire for transmitting the monitored result, 10 is a bias current in the laser 6, and 11 is a power amplifier. In FIG. 2, when the laser 6 is degraded, the bias current is increased. Therefore, by monitoring the bias current applied to the laser, the operation of the laser and/or the failure of the same is detected.

However, that system shown in FIG. 2 has the disadvantages shown below.

(1) The monitored data is indirect, since the power of a laser is not measured, but only the bias current of the same is measured.

(2) The monitored result is transmitted through an interstitial wire.

(3) The modulator 8 which is actually a voltage-frequency converter, is complicated, and has low reliability.

SUMMARY OF THE INVENTION

It is an object, therefore, of the present invention to overcome the disadvantages and limitations of a prior laser output monitoring system in a repeater by providing a new and improved laser output monitoring system.

It is also an object of the present invention to provide a laser output monitoring system which doubles as the error rate monitoring system without utilizing an interstitial wire, and that system is tele-controlled from a land station.

According to the present invention, each repeater comprises an optical-electrical conversion element for the conversion of the input optical energy to the electrical energy, an amplifier for amplifying the electrical output of said conversion element, an electrical optical conversion element for converting the electrical output of said amplifier to an optical energy which is transmitted to an output optical fiber cable, means for controlling the optical output of said electrical-optical conversion element, a switch means for providing the signal return path between the upward circuit and the downward circuit, and a monitoring circuit having a reference voltage generator for providing a reference level which is lower than the normal signal level when the signal has the mark ratio of ½, and a comparator for comparing the optical output power of said electrical-optical conversion element with said reference level, and means for transferring the monitored result to the terminal station.

The terminal station designates first the particular repeater to be tested and closes said switch to provide a signal return path. Then, the terminal station transmits the test signal in which the mark ratio is adjusted until the optical output power of the electrical-optical conversion element becomes equal to the reference level. The mark ratio of the test signal when the optical output power in the tested repeater becomes equal to the reference level, is the indication of the degree of the degradation of the electrical-optical conversion element in that repeater.

BRIEF DESCRIPTION OF THE DRAWINGS

The foregoing and other objects, features, and attendant advantages of the present invention will become better understood by means of the following description and accompanying drawings wherein.

DESCRIPTION OF THE PREFERRED EMBODIMENTS

Figure 1:
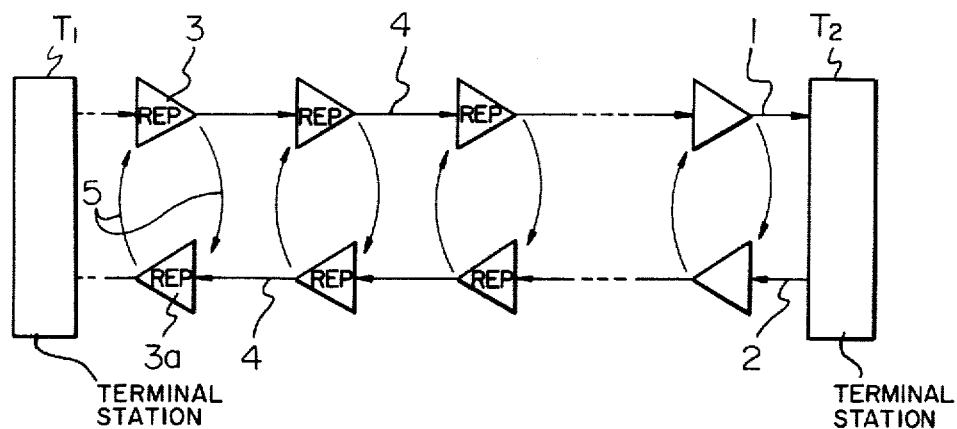
FIG. 1 shows the explanatory diagram of the operational test of a repeater in a communication system.
Figure 2:
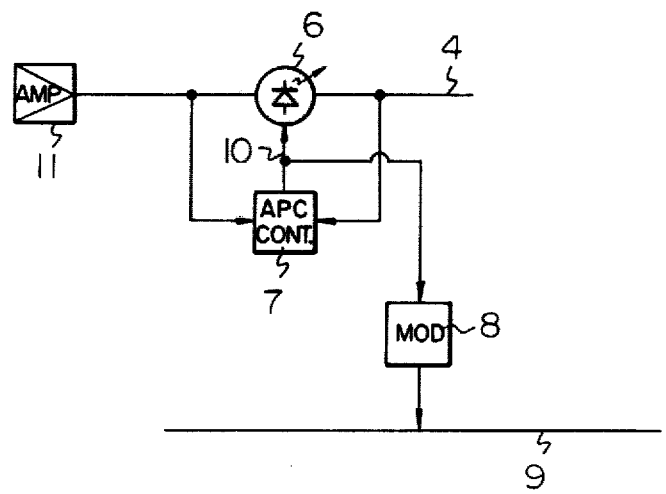
FIG. 2 shows a block diagram of a prior laser output monitoring system.
Figure 3:
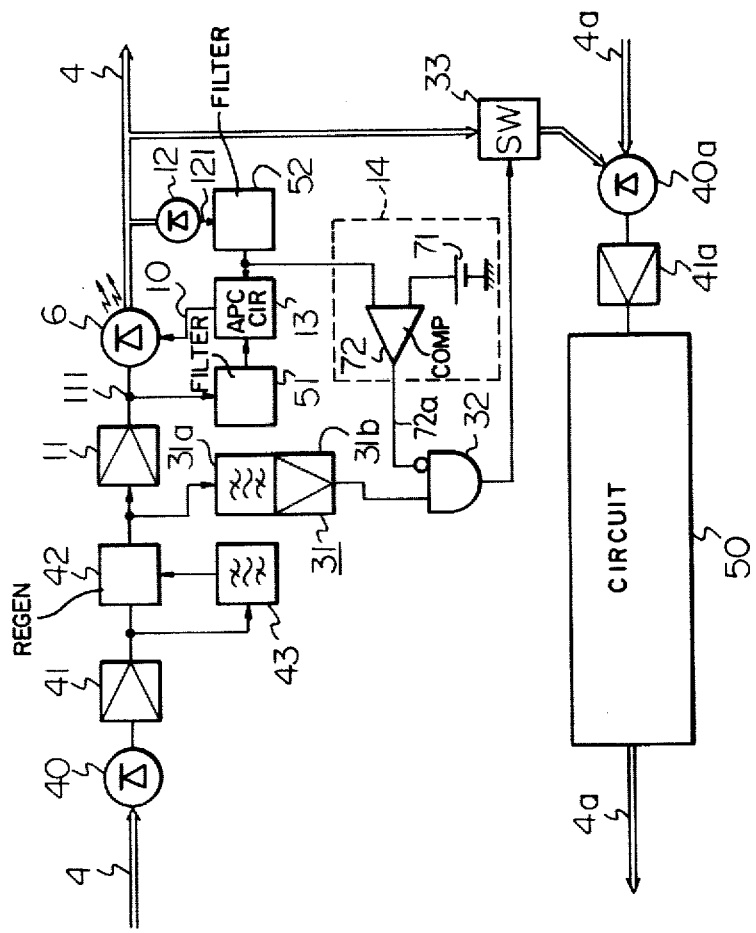
FIG. 3 is a block diagram of an optical repeater according to the present invention.

FIG. 3 is a block diagram of the optical repeater according to the present invention. The repeater has a pair of one way repeaters. In the figure, the reference numeral 4 is an optical transmission line in the upward direction, 40 is an optical-electrical converter for converting the received optical signal to the electrical signal, 41 is an amplifier for amplifying the output electrical signal of the converter 40, 42 is a regenerator for the regeneration of the digital signal of the received signal, 43 is a timing regenerator which derives the timing signal from the received signal and provides the derived timing signal to the regenerator 42, 11 is a power amplifier for amplifying the regenerated digital signal, 6 is a laser for converting the electrical signal at the output of the power amplifier 11 to an optical signal, and the converted optical signal is introduced to an optical fiber transmission line 4. Also, the reference numeral 12 is an optical-electrical converter (or a photo-diode) which is coupled with the output of the repeater through an optical divider (not shown) for monitoring the optical output of the laser 6, 51 and 52 are filters for smoothing the output currents of the amplifier 11 and the photo-diode 12, respectively, and 13 is an APC (Automatic Power Control) circuit for controlling the average power of the laser output power constant.

The repeater has the similar configuration in the opposite direction circuit, and the reference numeral 50 has the members corresponding to the members 42, 43, 11 and 6.

The laser 6 is energized by the D.C. bias current applied by the APC circuit 13, and the signal current provided from the power amplifier 11. Generally, the optical power of a laser depends upon the ambient temperature and the secular variation. Therefore, the ALC circuit 13 controls automatically the bias current of the laser 6 so that the average signal current becomes equal to the average optical output power.

The reference numeral 14 in FIG. 3 is a monitoring circuit according to the present invention, and the monitoring circuit 14 has the reference voltage generator 71 which provides the standard direct voltage, and the comparator 72 which compares the output of the smoothing filter 52 with the reference voltage from the generator 71. The smoother output represents the laser output. When the optical output of the laser 6 decreases, the output of the filter 52 decreases also, then, the bias current from the APC circuit 13 is increased to compensate the decrease of the laser output so that the output of the smoother 52 becomes equal to the output of the smoother 51. Thus, the decrease of the optical output of the laser 6 is compensated.

However, when the laser 6 is degraded too much, and the APC circuit 13 can not compensate that degradation, the decrease of the laser 6 can not be compensated, and the output of the smoother 52 remains lower than the desired value.

Figure 4:
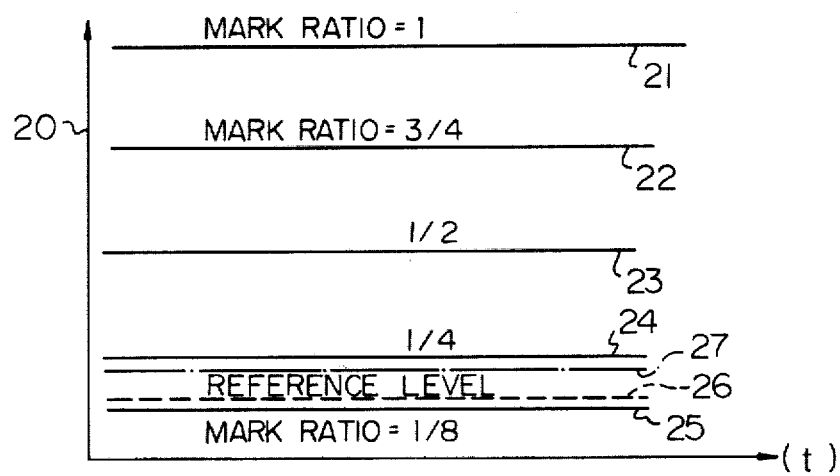
FIG. 4 shows the explanatory curves of the reference voltage and the laser output.

By the way, FIG. 4 shows the output voltage of the smoother 52 (vertical axis) with the parameter of the mark ratio of the signal. The horizontal axis of FIG. 4 shows the time (t). The curve 21 shows the case that the transmitted signal is always mark. The curve 22 shows the voltage of the smoother 52 when the mark ratio of the transmitted signal is $\frac{3}{4}$. Also, the curves 23, 24 and 25 show the cases that the mark ratio of the transmitted signal is $\frac{1}{2}$, $\frac{1}{4}$, and $\frac{1}{8}$, respectively. It should be appreciated that the mark ratio in general transmission signal is $\frac{1}{2}$, and so the output voltage of the smoother 52 is shown by the curve 23.

It is assumed that the reference voltage 71 is determined at the level of 26 in FIG. 4, then, the output voltage of the smoother 52 in case that the transmitted signal has the mark ratio of $\frac{1}{2}$, is higher than that reference level 26. Therefore, there is provided no output on the output line 72a of the comparator 72. On the other hand, when a test signal which has the mark ratio of $\frac{1}{4}$ is transmitted from the terminal station (not shown) on land to all the repeaters, the output voltage of the smoother 52 is at the level 25, which is lower than the reference level 26.

It is assumed that the degradation of the laser 6 becomes too deep, and the output voltage of the smoother 52 is decreased to the level 27 of FIG. 4. In this case, the level 27 is still higher than the reference level 26, and so the comparator 71 does not provide the output signal, so long as the mark ratio of the transmitted signal is $\frac{1}{2}$. On the other hand, when a test signal which has the mark ratio less than $\frac{1}{2}$ is transmitted from the terminal station on land, the output level 27 of the smoother 52 will reach the reference level 26, and then, the comparator 72 provides the output signal. It is assumed that the mark ratio of the test signal in case that the output level 27 of the smoother 52 is equal to the reference level 26, is X, and the difference between the level 23 which is the normal level for the mark ratio $\frac{1}{2}$, and the reference level 26 is S dB, then, the degradation of the laser 6 is given by the following formula (1).

$$S - 10 \log_{10}(\tfrac{1}{2})/ \times (dB) \tag{1}$$

where S is a known value determined by the system design.

Now, returning back to FIG. 3, the members for forwarding the monitored result to a terminal station on land are described. In FIG. 3, the reference numeral 31 is a reception circuit having a bandpass filter 31a and an amplifier 31b for receiving a selection signal for designating the particular repeater. Said selection signal is to be transmitted from a terminal station by designating the particular repeater to be tested with the particular frequency. Therefore, the repeater has the bandpass filter 31a, and the center frequency of the bandpass filter is defined for each repeaters. When that bandpass filter provides the output signal, the repeater recognizes that the terminal station transmits the signal for designating the own repeater to be tested. The reference numeral 32 is a gate circuit which provides the output signal only when the reception circuit 31 provides the output signal and the monitoring circuit 14 does not provide the output signal. The reference numeral 33 is an optical switch for composing a signal return path from the upward transmission path 4 to the downward transmission path 4a. That switch 33 is connected to the upward line 4 through an optical divider (not shown), and the output of the switch 33 is applied to an optical-electrical converter 40a in the opposite circuit. The operation of that switch 33 is controlled by the output of the gate circuit 32.

It is supposed that there is something wrong with the transmission line, and/or the transmission line is to be tested. Then, the terminal station designates the particular repeater for the test purpose by transmitting the particular frequency signal designated to that repeater. In this case, the reception circuit 31 of the designated repeater provides the output signal, and that reception circuit 31 makes the switch 33 turn ON to compose a signal return path. It should be noted that the monitoring circuit 14 does not provide an output signal at the initial stage of the test.

When the signal return path has been composed, the terminal station on land transmits a test signal which has the mark ratio less than ½. As the mark ratio of the test signal is decreasing, the comparator 71 provides the output signal when the instantaneous mark ratio provides the output level of the smoother 52 equal to the reference level. Then, the monitoring circuit 14 provides the output signal, which closes the gate circuit 32, then, in turn, the switch 33 is turned OFF, and the signal return path is broken.

Then, the terminal station on land recognizes the switch OFF of the designated repeater by the fact that the test signal generated in the terminal station itself does not return to the terminal station through that signal return path. Then, the terminal station can evaluate the degree of the degradation of the laser 6 of the designated repeater by the mark ratio of the test signal just when the monitoring circuit 14 provides the output signal or the signal return path is broken.

According to the modification of FIG. 3, the switch 33 can be replaced to a modulator. In that case, when the monitoring circuit 14 provides the output signal after the signal return path is provided, the modulator inverts the polarity of the returned signal to inform the terminal station on land that the monitoring circuit 14 provides the output signal.

Figure 5:
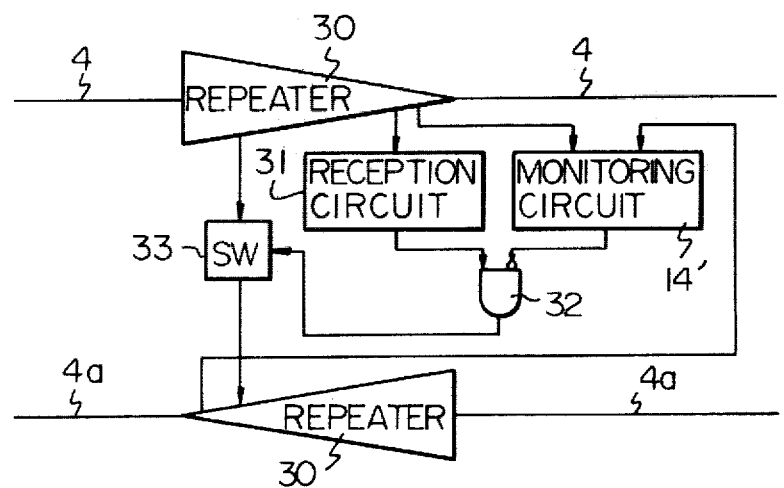
FIG. 5 is the block diagram of the alternative of the repeater according to the present invention.

FIG. 5 is the alternative of the embodiment of FIG. 3. In FIG. 5, the block 30 comprises the members 40, 41, 42, 43, 11, 6, 12, 13, 51 and 52 of FIG. 3. The feature of FIG. 5 is that the monitoring circuit 14' is common to both the upward circuit and the downward circuit, while the monitoring circuit 14 in FIG. 3 operates only for the one way, and if the both way test is desired a pair of monitoring circuits must be installed in a single repeater housing. It is quite apparent that the terminal station on land can differentiate which circuit, the upward circuit or the downward circuit, is wrong, when there is something wrong with the transmission system. Therefore, the common monitoring circuit 14' can monitor the circuits in both the directions. Other structures and operations of FIG. 5 are the same as those of FIG. 3.

Figure 6:
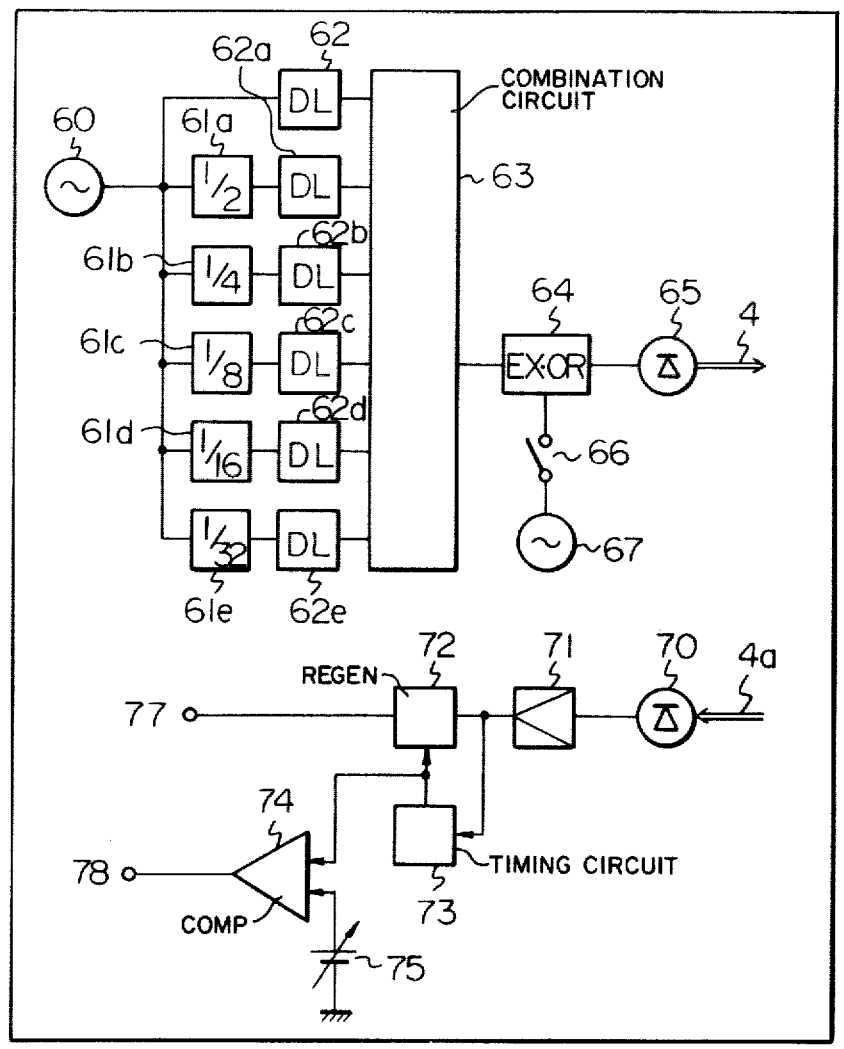
FIG. 6 is a block diagram of test equipment installed in a terminal station for the test of the repeaters and the transmission line.

FIG. 6 is the block diagram of the test unit installed in a terminal station on land. In FIG. 6, the reference numeral 60 is a pulse generator which provides the test signal having the mark ratio ½. The reference numerals 61a through 61e are dividers for deleting some of input pulses. The 61a provides only one half of the input pulses. The 61b provides only one fourth of the input pulses, and the 61e provides only 1/32 of the input pulses. The output of the generator 60 and the outputs of those dividers 61a through 61e are applied to the combination circuit 63 through the delay circuits 62 through 62e, which adjust the timing of the outputs of the generator 60 and the dividers so that each output pulse of 62 through 62e does not overlap with one another. The combination circuit 63 which has a plurality of AND circuits and OR circuits (not shown) combines the outputs of the delay circuits 62 through 62e, therefore, according to the combination of the combination circuit 63, the output pulse train having the desired mark ratio is obtained. It is supposed that the combination of the combination circuit 63 can be manually adjusted by changing the logic circuit in the combination circuit 63. Preferably, the combination circuit 63 has a pin board for connecting and/or disconnecting pins to conform the desired logic circuit. The output of the combination circuit 63 which has the desired mark ratio is applied to the exclusive-OR circuit 64, which also receives the output of the control signal generator 67 through the switch 66. The control signal generator 67 provides the frequency signal for designating the particular repeater, and the output of that generator 67 is applied to the exclusive-OR circuit 64 through the switch 66. Accordingly, the output of the combination circuit 63 is modulated, or the ON/OFF status of the same is reversed in the exclusive-OR circuit 64 by the output of the generator 67, and then, the output of the exclusive-OR circuit 64 has the frequency component equal to the frequency of the generator 67. The output of the exclusive-OR circuit 64 is converted from the electrical form to the optical form by the laser 65, the output of which is transmitted to the optical fiber line 4.

On the other hand, in the reception side, the photodiode 70 converts the optical signal from the optical transmission line 4a to the electrical signal, which is applied to the regeneration circuit 72 and the timing circuit 73 through the amplifier 71. The timing circuit 73 derives the timing signal from the received signal, and the derived timing signal is applied to the regeneration circuit 72 for the regeneration of the digital signal thus received. The regenerated digital signal is applied to the output terminal 77, to which an external circuit (not shown) for analyzing the error rate is connected. The output of the timing circuit 73 is also applied to one input of the comparator 74, the other input of which receives the reference voltage from the reference source 75, and when the first input from the timing circuit 73 becomes lower than the second input from the reference source 75, the comparator 74 provides the output signal to the terminal 78. The level of the output of the reference source 75 is supposed to be sufficiently low, and so the fact that the output of the timing circuit 73 is lower than the reference level indicates substantially that no timing signal exists. Accordingly, when the switch 33 in the repeater which is being tested is turned OFF, the timing signal from the timing circuit 73 stops, and the comparator 74 provides the output signal.

The operation of the apparatus in FIG. 6 is as follows. First, the switch 66 is closed, and the combination circuit 63 is adjusted so that the test signal having the mark ratio ½ is transmitted. The frequency of the generator 67 is selected to be equal to the center frequency of the bandpass filter 31a (see FIG. 3) of the repeater to be tested. Thus, the frequency which is particular to the designated repeater is transmitted from the laser 65 to the transmission circuit, and the switch 33 of that designated repeater is turned OFF. Then, the switch 66 is turned OFF, and the mark ratio of the transmission signal is decreased step by step by adjusting manually the combination circuit. When the comparator 74 provides the output signal, the mark ratio at that instantaneous moment obtained from the combination circuit 63 is the indication of the quality of the laser of the repeater which is now tested.

As described above in detail, the present invention provides the monitoring system of an output power of an optical source or a laser in an optical repeater by attaching a simple D.C. reference voltage source and a comparator to the repeater, and according to the present invention the operation of a laser in a repeater can be monitored at a terminal station on land.

Finally, some advantages of the present invention are enumerated.

(1) The output power of a laser is directly monitored.

(2) No interstitial wire is utilized for the transmission of the monitored result, which is transmitted through an optical fiber itself.

(3) The monitored result is a simple binary signal.

(4) The circuit configuration for monitoring the repeater is simple, and the reliability of the repeaters is not deteriorated by the presence of the monitoring circuit.

(5) The degree of the degradation of a laser can be measured by changing the mark ratio of the test signal which is transmitted from a terminal station on land, therefore, the measured result is quite accurate.

It should be appreciated that the present invention is applicable to the monitoring of the power output circuit which includes a laser and a power amplifier for energizing that laser, although the above embodiments mention the monitoring system of only a laser. Further, the present invention is applicable to the monitoring system of a repeater in general, and is not restricted to the monitoring of a laser only.

From the foregoing it will now be apparent that a new and improved laser output monitoring system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A monitoring system of an optical power in an optical repeater in an optical transmission system having a pair of terminal stations, a plurality of upward and downward repeaters inserted between said terminal stations through an upward optical fiber cable and a downward optical fiber cable, each of said repeaters having at least an optical-electrical conversion element for the conversion of the input optical energy to the electrical energy, an amplifier for amplifying the electrical output of said conversion element, an electrical-optical conversion element for converting the electrical output of said amplifier to an optical energy which is transmitted to an output optical fiber cable, means for controlling the optical output of said electrical-optical conversion element, and a switch means for providing the signal return path between the upward circuit to the downward path, in each transmission direction, characterized in that;

each of said repeaters further comprises of a monitoring circuit having a reference voltage generator for providing a reference level which is lower than the normal signal level when the signal has the mark ratio of $\frac{1}{2}$, and a comparator for comparing the optical output power of said electrical-optical conversion element with said reference level, and means for transferring the monitored result to one of the terminal stations, whereby one of the terminal stations designates the particular repeater to close said switch to provide a signal return path, transmitting a test signal adjusting the mark ratio of the same, until the optical output power of the electrical-optical conversion element becomes equal to the reference level.

2. The invention defined in claim 1, wherein said means for transferring the monitored result to one of the terminal stations has the switch turn OFF when the optical output power becomes equal to the reference level.

3. The invention as defined as claim 1, wherein said means for transferring the monitored result to one of the terminal stations has the polarity of the test signal which is to be returned reversed.

4. The invention as defined in claim 1, wherein a single monitoring circuit is provided commonly to both the upward circuit and the downward circuit in each repeater.

5. The invention as defined in claim 1, wherein said electrical-optical conversion element is a laser.

* * * * *